CIRCUIT BREAKER HAVING BREAK-AWAY WALLS

Original Filed Sept. 30, 1965 5 Sheets-Sheet 1

INVENTORS
ALEXANDER R. NORDEN
HERMAN H. KOBRYNER
BY
Hopgood & Calimafde
ATTORNEYS

CIRCUIT BREAKER HAVING BREAK-AWAY WALLS

Original Filed Sept. 30, 1965

INVENTORS
ALEXANDER R. NORDEN
HERMAN H. KOBRYNER
BY Hopgood & Calimafde
ATTORNEYS Feb. 13, 1968 A. R. NORDEN ET AL 3,369,099

CIRCUIT BREAKER HAVING BREAK-AWAY WALLS

Original Filed Sept. 30, 1965 5 Sheets-Sheet 3

INVENTORS
ALEXANDER R. NORDEN
HERMAN H. KOBRYNER
BY Hopgood & Calimafde
ATTORNEYS

CIRCUIT BREAKER HAVING BREAK-AWAY WALLS

INVENTORS
ALEXANDER R. NORDEN
HERMAN H. KOBRYNER
BY
Hopgood & Calimafde
ATTORNEYS

CIRCUIT BREAKER HAVING BREAK-AWAY WALLS

Original Filed Sept. 30, 1965 5 Sheets-Sheet 5

INVENTORS
ALEXANDER R. NORDEN
HERMAN H. KOBRYNER
BY
Hopgood Calimafde
ATTORNEYS 3,369,099
CIRCUIT BREAKER HAVING BREAK-AWAY WALLS Alexander R. Norden, New York, and Herman H. Kobryner, Forest Hills, N.Y., assignors to Murray Manufacturing Corporation, Brooklyn, N.Y., a corporation of New York Original application Sept. 30, 1965, Ser. No. 491,611, now Patent No. 3,339,052, dated Aug. 29, 1967. Divided and this application Apr. 14, 1967, Ser. No. 647,264
3 Claims. (Cl. 200—168)

ABSTRACT OF THE DISCLOSURE

A two-pole circuit breaker is provided with specifically located break-away walls in order to afford alternative access means for cable entry and attachment to the breaker line connectors.

This is a division of application Ser. No. 491,611, filed Sept. 30, 1965, now Patent No. 3,339,052.

This invention relates to circuit breakers and in particular to a two-pole circuit breaker of the plug-in type for use in branch and main circuits in a load center and as a service entrance breaker in an individual enclosure.

When mounting a circuit breaker in a load center or individual enclosure, several considerations bear upon its positioning. Where several breakers are mounted on a single panel board, the largest breaker dimension is generally disposed horizontally. (For convenience, we will refer to the breaker peripheral portion parallel to the longest dimension as a "side" and the peripheral portion prependicular to this dimension as an "end.") While there is no convention in such a case, it is desirable that all breaker operating handles assume the same relative position for "off" and "on." When used in a separate enclosure, on the other hand, the breaker handle should be up for the "on" condition, as is the convention for all switches.

A distinct consideration is the relative disposition of the breakers vis-a-vis cable entrance openings, since it may be convenient to feed the wires to the breaker either in line or perpendicular with the circuit breaker side in order to reduce cable distortion.

Accordingly, it is the object of this invention to provide a circuit breaker designed in such a way that the same parts may be factory assembled in different ways to produce breakers, adaptable to end or side wiring, with the handle "on" position in the first or second (opposite) direction. That is, four distinct alternatives are made available:

(1) "On"-"off"; side wiring.
(2) "On"-"off"; end wiring.
(3) "Off"-"on"; side wiring.
(4) "Off"-"on"; end wiring.

It is another object of this invention to satisfy the first object in such a manner that the factory produced breaker may be field modified to the desired alternative.

The above mentioned and other features and objects of said invention and the manner of attaining them will become more apparent, and the invention itself will best be understood by reference to the following description of an embodiment of the invention, taken in conjunction with the accompanying drawings, wherein.

Figure 11:
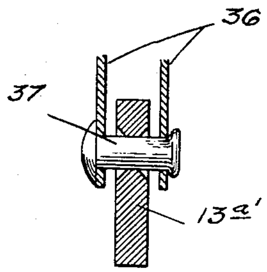
FIG. 11 is a detail fragmentary sectional view showing a modified form of a movable contact arm of the circuit breaker switch and also showing a modified connection between the arm and frame to permit side-swiveling of the arm.
Figure 12:
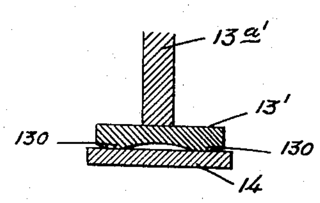
Figure 13:
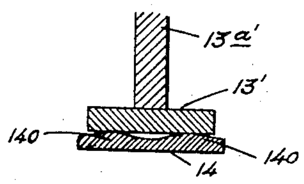

FIG. 12 is a fragmentary front view of a modified contact provided on the contact arm of FIG. 11 and shows this contact engaged along two distinct contact surfaces with the fixed contact of the circuit breaker switch; and FIG. 13 is similar to FIG. 12 but shows the fixed contact as modified, instead of the movable contact, to provide two distinct contact surfaces for engagement with the movable contact.

Figures 1, 2:
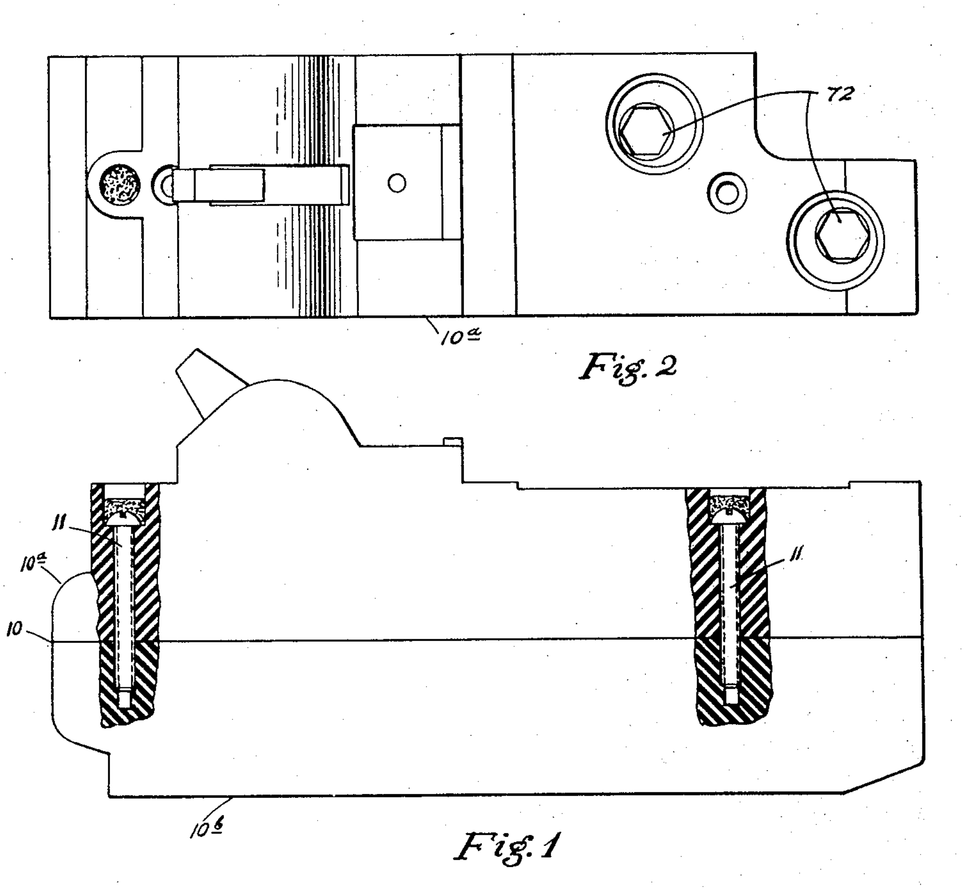
FIG. 1 is an outside side view of the illustrative two-pole main circuit breaker and is partially sectioned to show the manner in which cover and base parts of the circuit breaker casing are secured to each other.
FIG. 2 is a top view of the circuit breaker.

The illustrative circuit breaker is a two-pole circuit breaker, the respective poles of which comprise similar toggle-linked, magnetically trippable switches. The two poles are housed alongside each other in an elongated insulating case 10 (FIG. 1) made up of a cover part 10*a* (also see FIGS. 2 and 7) and a base part 10*b*, fastened together by screws 11. The side and end walls, as well as an interior longitudinal separating wall 10*c* between the poles, are composed of matched sections of the cover and base.

Figure 8:
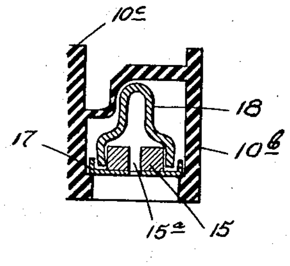
FIG. 8 is a fragmentary section on line 8—8 of FIG. 4.

Each pole includes a movable contact 13 for engaging a fixed contact 14. The fixed contacts of the respective poles are permanently secured on the nose ends of a pair of copper bars 15 immovably set into the base 10*b* and separated by the wall 10*c*. Bars 15 have coplanar straight sections over the floor of the base and are formed with elongated slots 15*a*, one through each straight section, in parallel disposition, the slots being spaced and sized so as to adapt them for plug-in engaged fit with a pair of bus blades of a suitable bus arrangement where each bus blade will be connected with a bus for servicing a group of load circuits. Preferably, the slots 15*a* are spaced the standard distance of one inch prevailing for bus blades of bus arrangements in load centers. The slotted portions of bars 15 extend above access openings 16 centrally provided between the ends of the base 10*b*. Flat insulating pieces 17 shield bars 15 at the openings 16 except for the slots 15*a* which are exposed and accessible for reception of a pair of bus blades. Fixed to bars 15 are the legs of inverted U-shaped metal clips 18 (also see FIG. 8) which are housed in pockets 19 of base 10*b*, each clip being above and in registration with a slot 15*a* so as to provide increased contact pressure for a bus blade.

The movable contacts 13 of the respective poles are permanently secured to the free ends of contact arms 13*a* which are elements of a pair of upper assemblies insertably fitted side-by-side in the casing 10 and separated by the interior casing wall 10*c*. Common to and across both assemblies is an insulating one-piece cam drum 20 integrally provided with a handle 21 which projects from the middle section of the cam drum through an opening in the top of the casing. At opposite sides of its middle section, the drum 20 is formed with a pair of identical bifurcated or channeled cams 22, one for each pole assembly. Each pole assembly includes an L-frame having a side lug 24 (FIGS. 4 and 5) keyed into a locating notch 25 (FIG. 7) in the side of the casing cover 10*a*. The vertical leg of the frame 23 terminates in a pair of yoke arms 26 which straddle a cam 22 and carry a pivot pin 27 for the cam. The inner end of each pivot pin abuts the middle section of the drum 20, the outer end of the pin insertably fits into a notch 28 in the adjacent side of the cover 10*a*. The two pins 27, one to each side of the central section of the drum, thus journal the drum on the pair of frames 23. The pins are free in the support arms 26 and in the drum and may be slipped out when the upper assemblies are out of the casing (for field modification).

The drum 20 is formed at opposite ends with arcuate flanges 30 spaced around the arcuate tops of the outer frame arms 26. Engagement of the ends of the flanges with opposite side edges of these frame arms limits the angle through which the drum may be moved. This is the angle between "off" and "on" positions of the drum and its handle 21, the angle being 90 degrees in the present embodiment. Nested between each flange 30 and the top of the adjacent frame arm 26 is a small coil spring 31 which is hooked at its upper end on a stud 32 projecting from the drum end. The lower end of the spring may be hooked into either one of the opposite holes 33 and 34 in the frame arm. In the attitude of the circuit breaker shown in FIG. 4, the handle when in "off" position points away from the tail (load) end of the circuit breaker, the lower end of the spring 31 is hooked into the hole 33 and the spring biases the drum and handle counterclockwise. To set the handle 21 in "on" position, it will be moved to the right. It is anticipated that the manufacturer will offer left and right handle positions as stock items and that the same parts will be assembled differently to effect this result. Should field modification be required, however, the upper pole assemblies may be removed from the casing 10, the springs 31 unhooked from the holes 33, the pivot pins 27 removed, and the drum 20 dismounted. The drum is then reversed end-around and remounted by re-inserting the pivot pins 27 after which the lower ends of the spring 31 may be hooked into the holes 34 in the outer arms 26. With the drum 20 re-assembled on the frames 23 in end-around attitude relative to its attitude in FIG. 4, the handle in "off" position will point towards the tail end of the circuit breaker and will be biased by the springs 31 in that direction.

Figure 4:
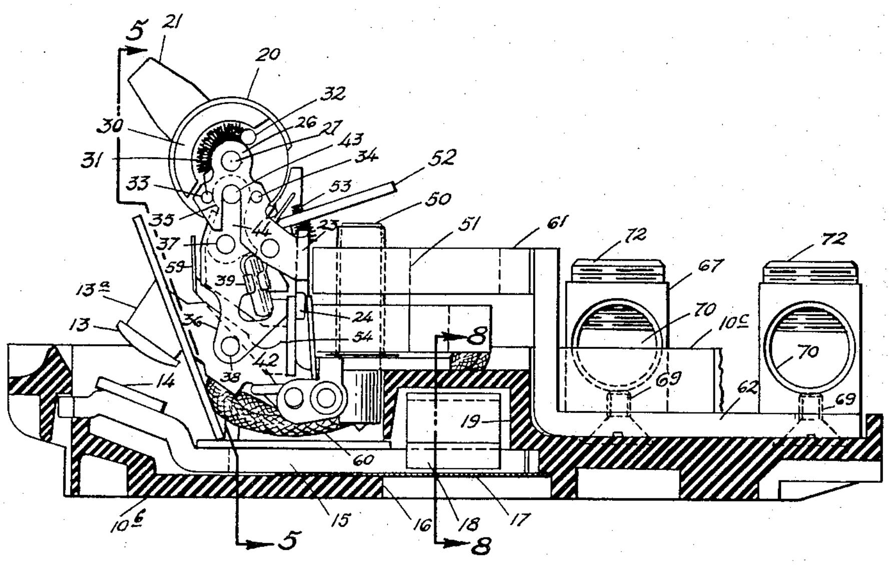
FIG. 4 is a sectional view taken substantially along line 4—4 of FIG. 3.
Figure 6:
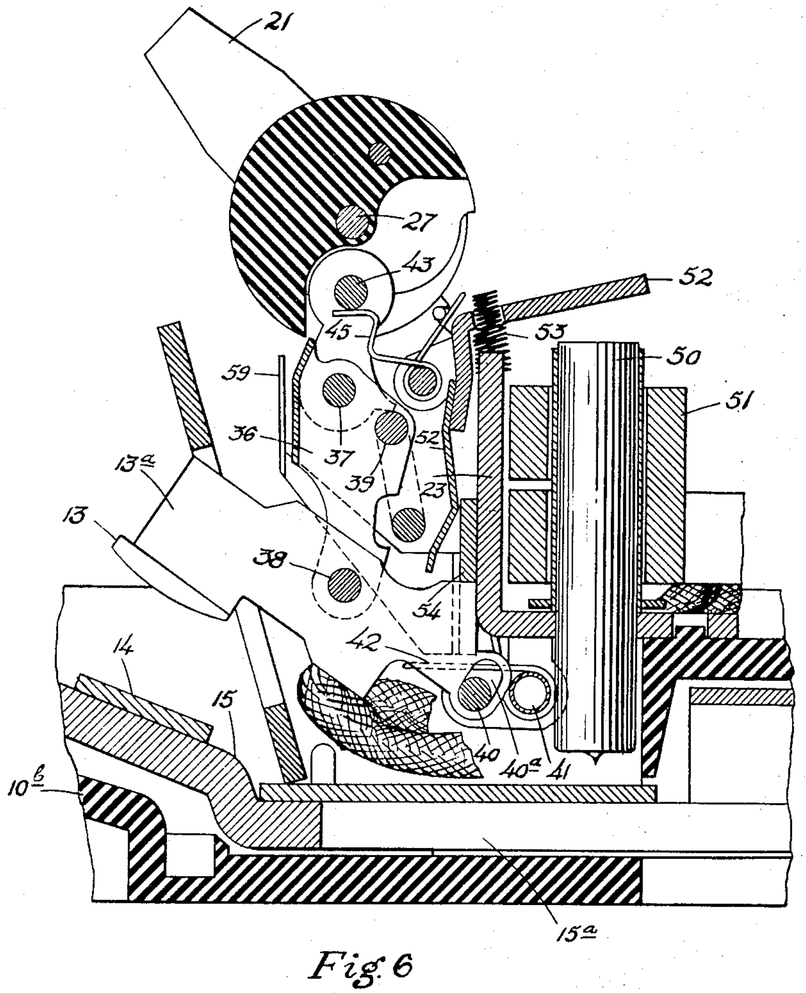
FIG. 6 is a section taken substantially along lines 6—6 of FIG. 3.

The cams 22 of the drum 20 and switch-operating linkages will have the same working relation regardless of whether the drum is mounted in the attitude shown in FIG. 4 or in the end-around attitude, as will be made clear. The switch-operating linkage of each pole is here a toggle linkage which includes a first link 35 and a second link 36 pivotally connected at its upper end to the first link by a pin 37 and pivoted at its lower end by a pin 38 to the movable contact arm 13*a* of the pole. A U-shaped stiff wire latch 39 is pivotally carried by the second link and engages the first link. The contact arm 13*a* is provided at its rear end with a slot 40*a*, extending generally in the direction of movement of the contact arm, for receiving a pin 40 (see FIGS. 4 and 6) supported between lower ears 41 of a frame 23, whereby the contact arm is floatingly pivoted to the frame. A looped wire spring 42 engaged with the contact arm provides restoring force for the arm and the connected linkage.

Figure 9A:
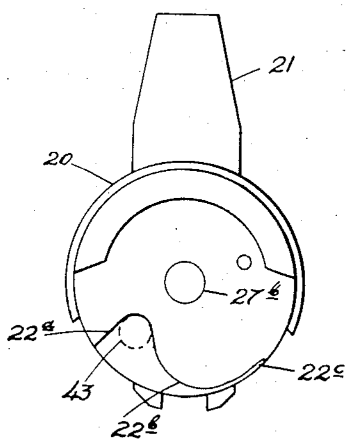
FIG. 9 is an end view of a cam drum and its handle provided in the circuit breaker for operating the switch means of the two poles of the circuit breaker.
Figure 9B:
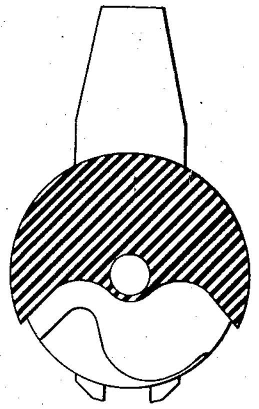

The upper end of first link 35 (FIGS. 4 and 5) of each toggle intrudes into the channel of a cam 22 so as to be restricted in side play. Directly below the channel, the link 35 rotatively carries a follower pin 43 engaging the cam sections partially divided by the channel. The ends of the pin 143 are slidably guided in straight slots 44 (also see FIG. 6) formed in the pair of frame arms 26 which straddle the cam. A wire spring 45 presses the follower pin against the cam periphery. The guide slots 43 are disposed along a radial line (vertical, as shown) which bisects the "off" to "on" angle (90 degrees) of the drum 20 and its handle 21. FIG. 9 shows the cam profile and the relation thereto of the cam follower pin 43 when the drum is in "off" position. The follower pin is then in the crotch between an abrupt, vertical edge 22*a* of the cam profile and the low end of a curved cam rise 22*b* which terminates in a depression 22*c*. If the handle 21 now be moved (clockwise in FIG. 9) to its "on" position, the cam rise will traverse the follower pin and actuate it downwardly in the guide slots 44 until depression 22*c* of the cam seats on the pin, which occurs at the end of the 90-degree movement of the handle when the handle reaches "on" position.

It is clear now that since the "off" and "on" positions of the drum 20 are symmetrical with respect to the locus of travel of the follower pin 43, the drum 20 may be turned around on the frames 23, end-to-end, in the manner previously explained, without changing the working relation of the cam to the follower pin, so that the "off" and "on' positions of the handle 21 may be interchanged to suit convention in any attitude of the circuit breaker in the load center.

When the handle 21 is moved to "on" position, the cams 22 act on follower pins 43 to drive the toggles of both poles to lowered, latched position in which the contacts 13 on contact arms 13*a* engage the fixed contacts 14. Manual return of the handle to "off" position permits the springs 42 to restore the toggles to raised position in which the contacts 13 are disengaged from contacts 14.

Either toggle may be tripped from lower, latched position by rocking its latch 39 forwardly, the latch being the equivalent of the toggle latch shown in Patent 2,759,063. For this purpose, each pole includes a known form of electromagnetic means responsive to an overload current in the pole circuit. The electromagnetic means comprises a core unit 50, fixed on the horizontal leg of the frame 23, and a winding 51 in the current conducting circuit of the pole. When the current exceeds the rating, the electromagnet develops force for rocking the bell crank armature 52 clockwise (FIG. 6) against the resistance of spring 53; the vertical arm of the armature strikes the confronting latch 39 and rocks it to trip the toggle for restoration by associated spring 42.

Figure 5:
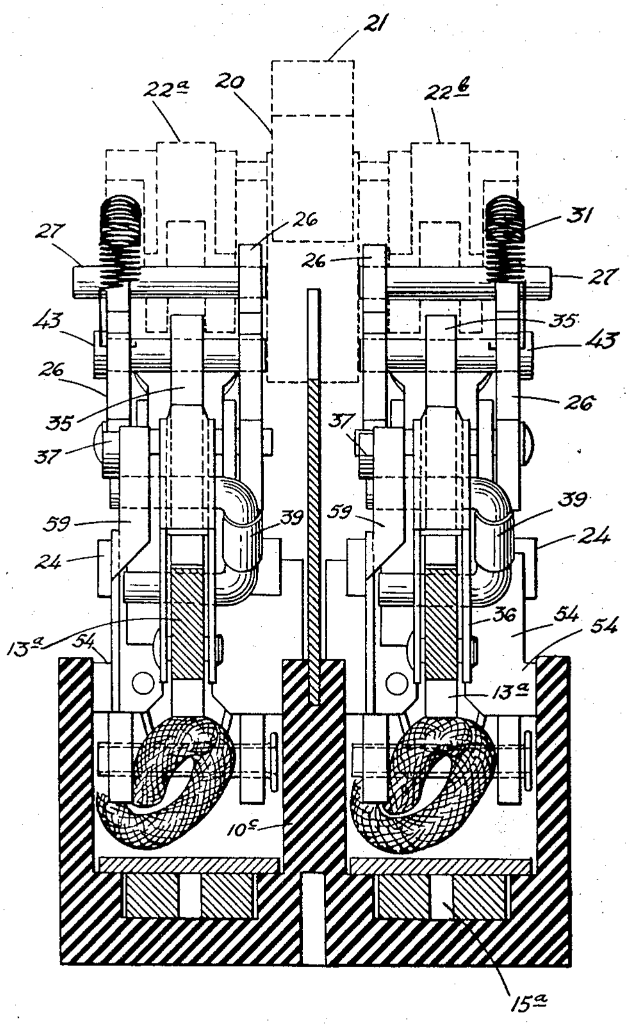
FIG. 5 is a sectional view substantially along line 5—5 of FIG. 4 and is broken away in part to show more clearly the form of a rockable bridge between the two poles of the circuit breaker.
Figure 10:
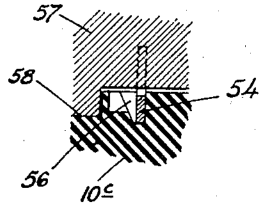
FIG. 10 is a fragmentary longitudinal sectional view through the base section of an interior wall of the casing and shows a fulcruming notch in said base section for the bridge between the poles, a portion of the bridge and of a hold-down element therefor also being shown.

The toggle in either pole when tripped causes tripping of the toggle in the other pole through an insulating bridge 54 which, as may be understood from FIG. 5, has a dual inverted U-form, one U part being behind the vertical arm of one armature 52 and the other U part being located behind the vertical arm of the other armature. The ends of the bridge 54 are seated at the bottom of notches 55 in the side wall sections of the casing base 10*b*. The middle part of the bridge, that is, the connecting part between its U sections, rests on the blunt bottom of a half V-form notch 56 (see FIG. 10) in the base section of the interior wall 10*c* of the casing, whereby the bridge may tilt forwardly. Normally, the bridge is held back by the armatures under the influence of their springs 53. A thin, insertable insulating member 57 fits at the bottom in a notch 58 in the base section of wall 10*c* and extends with clearance over the middle part of the bridge 54 to keep it down. The upper edge of the member 57 is arcuately concave to fit to the middle section of the cam drum 20 which may be provided with lugs (not shown) to steady the member at the top against lateral shifting. Member 57 also serves as a supplementary insulator between the poles in addition to serving to keep the bridge in place in the notches 55 and 56. Riveted to the bridge are fingers 59 which extend forwardly into confrontation with projecting ends of the pivot pins 37 between the respective first and second links 35 and 36 of the two toggles. When the toggle in either pole is tripped, the first and second links of the toggle buckle and their pivot pin 37 snaps forwardly and strikes the confronting finger 59. This results in rocking of the bridge 54 to actuate the armature 52 of the other pole for striking the latch 39 of the toggle in the latter pole, thereby tripping this toggle.

Figure 7:
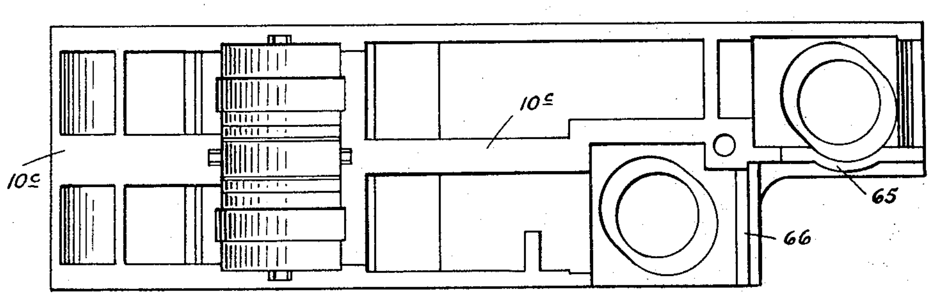
FIG. 7 is a bottom view of the casing cover.
Figure 3:
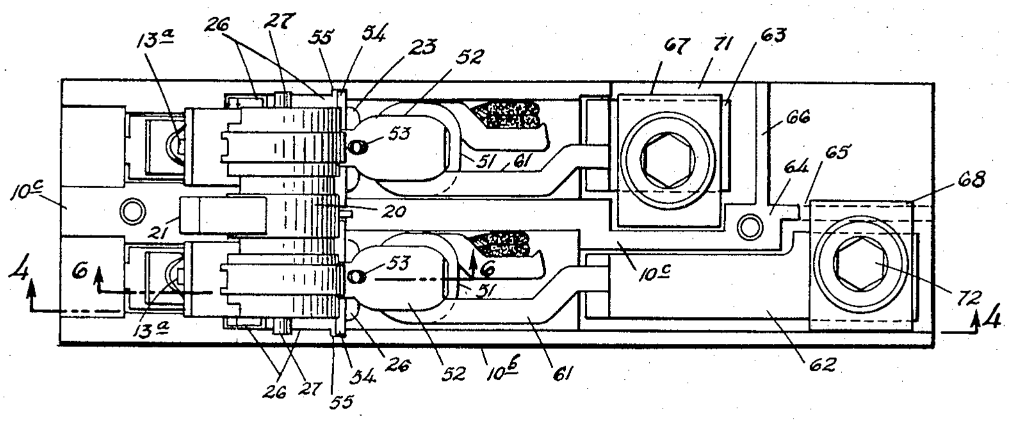
FIG. 3 is a enlarged plan view of the circuit breaker, with the casing cover removed.

The winding 51 of each trip magnet is in series with the movable contact arm 13$a$ of the same pole side through a pigtail connection 60. For the illustrative circuit breaker, each winding 51 consists of two turns of a thick copper bar 61. The bars 61 of the respective poles are permanently secured to the vertical legs of thick copper angle bars 62 and 63 having their horizontal legs resting on the floor of the casing base 10$b$. The interior longitudinal casing wall 10$c$, which separates the two pole sides, may be considered as terminating in a corner post 64 which is a distance away from the extreme tail end of the casing. As formed, the casing has a pair of walls 65 and 66 integrally joined with the post 64, the wall 65 being in effect a continuation of the wall 10$c$ and terminating at the extreme tail end of the casing, the other wall 66 being at a right angle to the wall 65 and terminating at a side of the casing. The walls 65 and 66 are recessed at the vertex of the corner angle between them so as to join the corner post 64 along thinned lines which constitute pre-weakened lines of joinder to facilitate breaking away of either wall from the casing. In FIGS. 3 and 7, the wall 65 is shown dot-dash to indicate that this wall has been broken away. The angle bar 63 is at one side of the dividing wall 10$c$ and its horizontal leg reaches substantially to the transverse wall 66. The other angle bar 62 is at the opposite side of the dividing wall and has a longer horizontal leg which reaches substantially to the tail end of the casing 10.

Seated on the horizontal portion of the angle bar 63 is a wire connector 67. A similar connector 68 is seated on that portion of the angle bar 62 which extends between the corner post 64 and the tail end of the circuit breaker. The connectors, comprising rectangular blocks, are mounted on the bars by screws 69 which enable the connectors to be fixed in position either with line-receiving openings 70 disposed longitudinally or transversely of the casing 10. FIGS. 3 and 3 premise a situation in which the circuit breaker is mounted in a load center which has a pair of parallel main line cables, such as the opposite voltage line cables of a 120–240 power supply, running toward the side of the casing 10 to which the transverse corner wall 66 extends. Accordingly, the longitudinally extending corner wall 65 has been broken away and the connectors 67 and 68 have been mounted with their openings 70 oriented toward said side of the casing. One main line can be brought directly, through an opening 71 in said side of the casing, into the connector 67. The other line can be brought directly into the connector 68 inasmuch as the wall 65 has been broken away. The connectors are provided with clamp screws 72 accessible, through holes in the casing cover, for turning to clamp the ends of the line cables to the connectors.

If the lines run toward the tail end of the circuit breaker, then instead of breaking away the wall 65, the wall 66 will be broken away and the connectors 67 and 68 will be disposed on bars 63 and 62 with their line-receiving openings 70 oriented toward the tail end of the casing. The tail end of the casing is formed open opposite the connector 68, so that one of the main lines running toward the tail end can be brought directly into the connector 68 to be clamped therein. With the transverse wall 66 broken away, the other line running toward the tail end of the breaker can be brought directly into the connector 67 to be clamped therein.

In either case, the wall 65 or 66 left standing serves as an insulator wall between the main lines extending into the circuit breaker.

FIGS. 11, 12 and 13 relate to a feature of the invention involving modification of the switch contacts in a breaker pole to insure at least two-point engagement of the contacts, regardless of manufacturing or assembling inaccuracies or without the necessity of manufacturing or assembling the switch parts to strict tolerances. As indicated in FIG. 11, a movable contact arm 13$a'$, corresponding to contact arm 13$a$ of the main embodiment, has a swivel coupling to the second toggle link 36. Aside from the example shown in FIG. 11, this coupling may take any other suitable form which will permit side-swiveling of the contact arm 13$a'$ relative to the link 36, an action which is not inhibited by the pin-and-slot means 40–41 (FIG. 6) which floatingly pivots the contact arm to a frame 23. Referring now to FIG. 12, the contact arm 13$a'$ has on its free end a modified contact 13' for engagement with the fixed contact 14. Contact 13' is formed at the extremes of its width with a pair of parallel ridges 130 which constitute distinct contact surfaces preferably running the length of the movable contact. When the toggle linkage is actuated to bring the contact arm 13$a'$ down to engage the contact 13' with the contact 14, if the contacts do not meet squarely, one of the ridges 130 will first engage the contact 14, causing the contact arm 13$a'$ to tilt sidewise about the engaged ridge until the other ridge 130 is also engaged with the contact 14. Thus, at least a two-point engagement between the cooperable contacts of the breaker switch is assured, allowing for greater tolerances in manufacture and assembly of the parts. Instead of the contact ridges being formed on the movable contact, they may be formed at the extremes of width of the fixed contact, as indicated in FIG. 13. Here, a fixed contact 14' is formed with the ridges 140 and the coaction of these ridges with the contact 13' (similar to the contact 13 of the main embodiment) carried by the free end of the modified contact arm 13$a'$ will be the same as explained in connection with FIG. 12 where the contact ridges (130) are on the movable contact.

While there have been described above the principles of the invention in connection with specific apparatus, it is to be clearly understood that this description is made only by way of example and not as a limitation to the scope of the invention, as set forth in objects thereof, and in the accompanying claims.

What is claimed is:

1. A two-pole circuit breaker to be connected in a load center to a pair of voltage lines, line-to-pole; comprising an insulating casing mounting therein the two poles side-by-side, a first of the poles terminating closer to one end of the casing than the second pole; the terminal portions of the first and second poles respectively being provided with first and second line connectors, the first connector being accessible through an opening in said casing end and the second connector being accessible through an opening in a side of the casting, the casing being formed in the corner between the connectors with first and second walls substantially at a right angle to each other, the first wall blocking access to the first connector from said casing side and the second wall blocking access to the second connector from said casing end, the two walls being formed with pre-weakened, breakage lines to facilitate breaking away of either wall, the first wall being broken away to enable the pair of voltage lines to be brought to said connectors from said casing side, the second wall then serving as an insulator between the voltage lines, the second wall being alternatively broken away to enable the voltage lines to be brought to the connectors from said casing end and the first wall then serving as an insulator between the voltage lines.

2. A two-pole circuit breaker to be connected in a load center to a pair of generally parallel and stiff voltage cable lines, pole-to-line; the circuit breaker comprising an insulating casing mounting therein the two poles side-by-side and having an interior wall extending between and separating the two poles, a first of the poles terminating closer to one end of the casing than the second of the poles, the terminal portions of the first and second poles respectively being provided with first and second line connectors, the first connector being accessible through an opening in said casing end and the second connector being accessible through an opening in a side of the casing, said interior wall terminating in a corner post between the two connectors, the casing being formed in the corner between the connectors with first and second corner walls extending substantially right angularly to each other from said corner post, the first wall blocking access to the first connector from said casing side and the second wall blocking access to the second connector from said casing end, the two corner walls joining the corner post integrally along pre-weakened lines to facilitate breaking away of either wall, the first corner wall being broken away to enable a pair of such voltage lines running toward said casing side to be brought with substantially no change in direction to the first and second connectors, one line to each connector, the second corner wall then serving as an insulator between the lines, the second corner wall being alternatively broken away to enable a pair of such voltage lines when running toward said casing end to be brought with substantially no change in direction to the first and second connectors, one line to each connector, and the first corner wall then serving as an insulator between the lines.

3. A circuit breaker as in claim 2, each said connector having an opening therein for reception of a line cable, the connectors being alternatively settable on the terminal portions of the respective poles with their openings oriented either toward said casing end or toward said casing side.

References Cited

UNITED STATES PATENTS 2,225,791 12/1940 Nau et al. ---------- 200—168

ROBERT K. SCHAEFER, *Primary Examiner.*

H. O. JONES, *Assistant Examiner.*